Aug. 2, 1960   R. M. WOYTYCH   2,947,224
ATTACHABLE WAYS FOR MACHINE COLUMNS
Filed Aug. 8, 1956   3 Sheets-Sheet 1
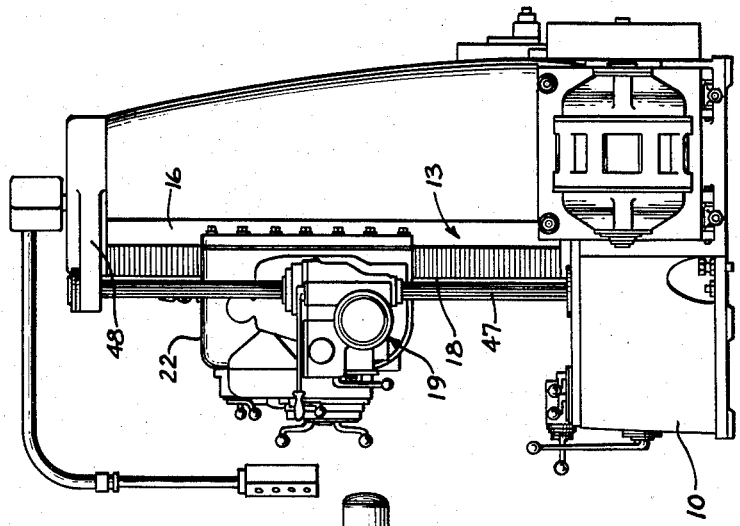
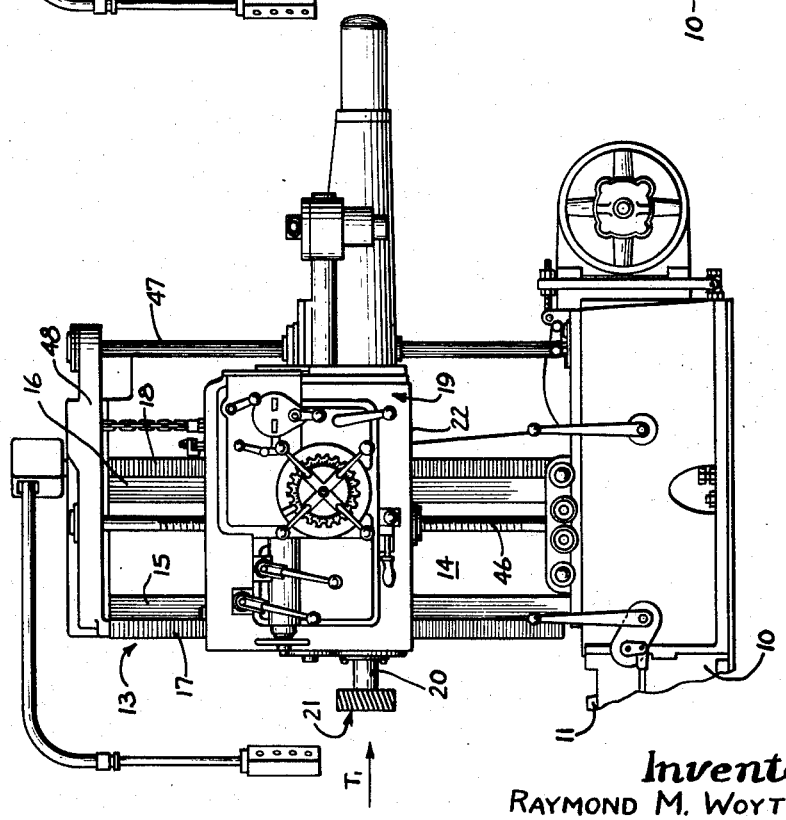
Inventor
RAYMOND M. WOYTYCH
by: Carlson, Pitzner, Hubbard & Wolfe
Attys.

Aug. 2, 1960  R. M. WOYTYCH  2,947,224
ATTACHABLE WAYS FOR MACHINE COLUMNS
Filed Aug. 8, 1956  3 Sheets-Sheet 2
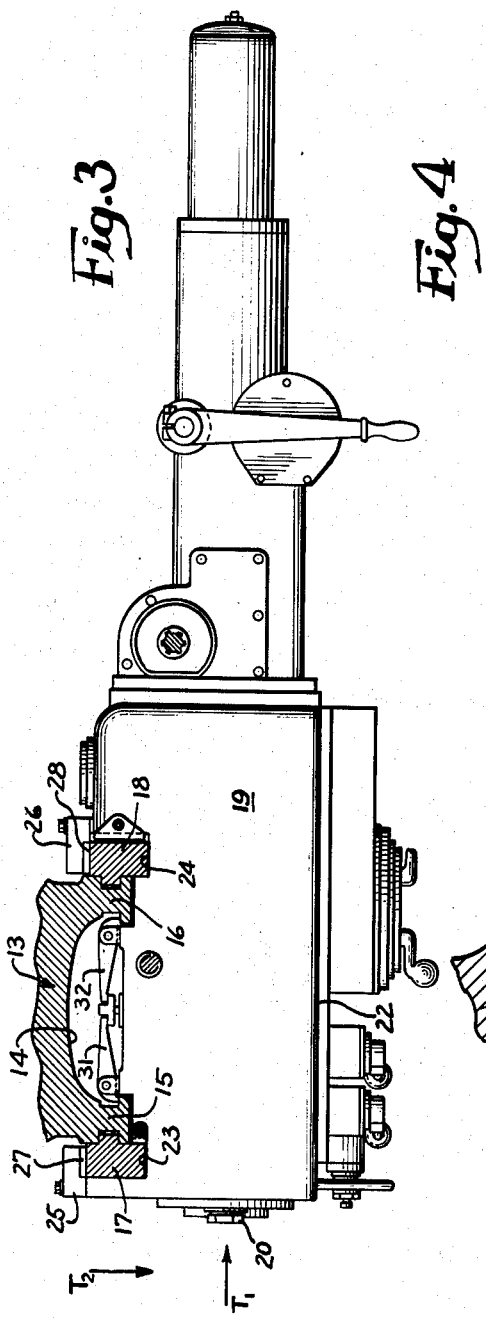
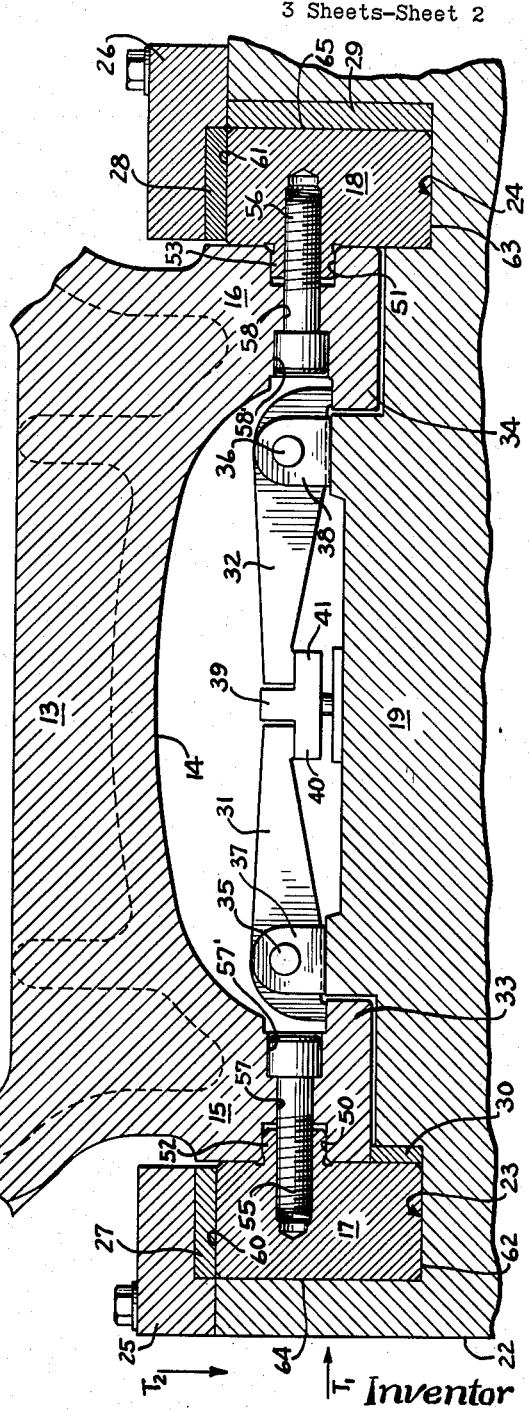
Inventor
RAYMOND M. WOYTYCH
by: Carlson, Pitzner, Hubbard & Wolfe
attys.

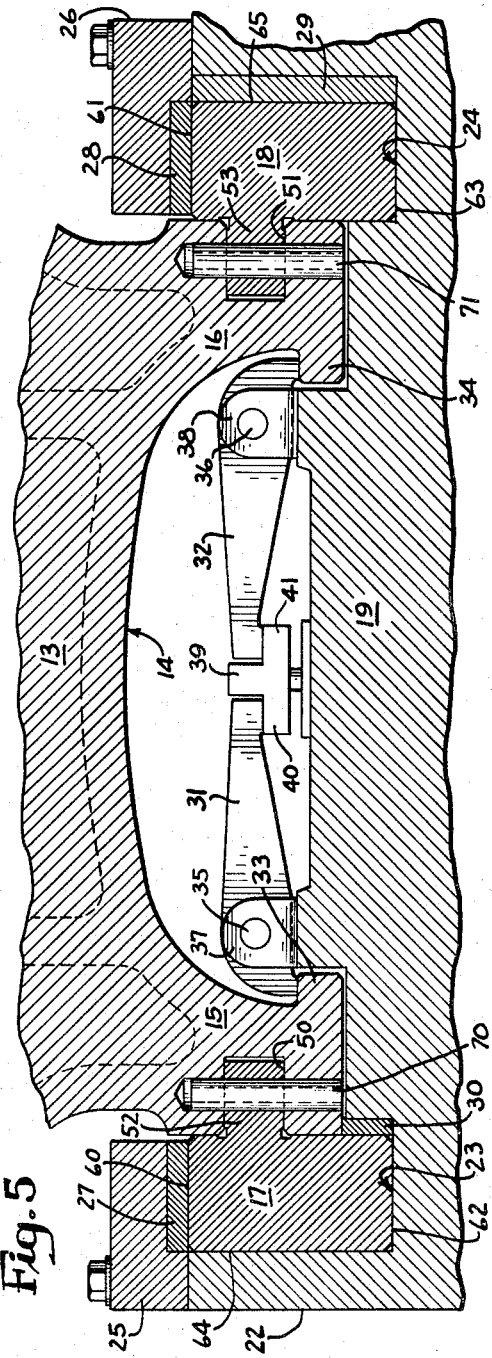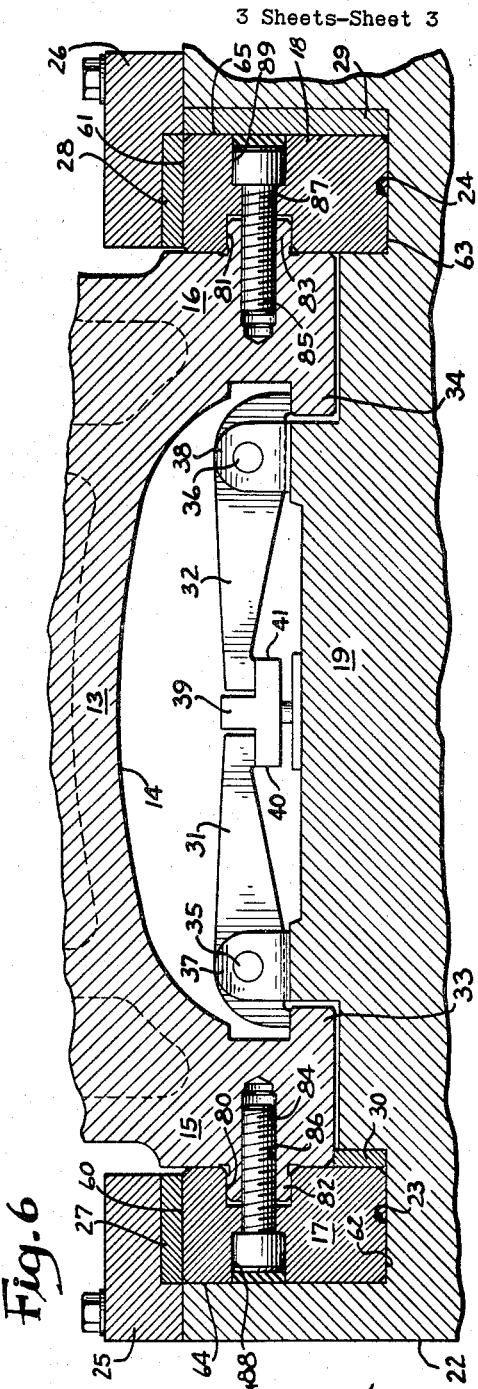

United States Patent Office 2,947,224
Patented Aug. 2, 1960

2,947,224

ATTACHABLE WAYS FOR MACHINE COLUMNS

Raymond M. Woytych, Fond du Lac, Wis., assignor to Giddings & Lewis Machine Tool Company, Fond du Lac, Wis., a corporation of Wisconsin Filed Aug. 8, 1956, Ser. No. 602,728

5 Claims. (Cl. 90—11)

This invention relates to the construction of the vertical ways on the columns of horizontal boring, drilling and milling machines.

In a horizontal boring, drilling and milling machine, the headstock carrying the horizontal tool spindle is vertically reciprocable on the face of the machine tool column. The vertical bearing surfaces on the column are subject to large reaction forces and at the same time must be accurately and precisely maintained. Accordingly, it is the usual practice to mount separable way or guide elements on the face of the machine tool column so that the elements may be more readily machined, finish ground, and treated for hardening of the wear surfaces.

While limited bearing areas must be presented by the ways over all of the load bearing or guiding surfaces, certain of these surfaces are subjected to the major stresses developed during the machining operations. It is primarily these stresses that place severe demands on the way structures and as a consequence, on the mounting for the ways. For facilitating manufacture and maintenance it is desirable that the ways be easily assembled and disassembled, and the mounting arrangement of necessity must so lend itself. Moreover, the assembly of the ways on the machine tool columns must provide a rigid structure for mounting the headstock.

Essentially, therefore, the main considerations for way structures of the type referred to, are first: the presentation of multi-load-bearing surfaces, certain of which are so dimensioned and arranged as to distribute the major stresses involved with the greatest efficiency to the machine tool column, and, second: a mounting arrangement facilitating assembly and disassembly without sacrificing rigidity.

It is accordingly a general object of the invention to provide an attachable way construction for vertical machine columns mounted to present a rigid support for the headstock. It is another object of the invention to provide a way construction for vertical columns of horizontal boring, drilling and milling machines in which stresses in the support means for the ways is minimized.

It is another object of the invention to provide detachable vertical ways for the vertical column of a machine tool, presenting proportionally larger bearing areas for those guiding surfaces subjected to the major stresses developed in the machining operations, and providing for increased efficiency in transmitting these stresses to the machine column.

It is still another object of the invention to provide an attachable guideway construction adaptable to conventional column structures.

Other objects and advantages will become apparent as the following description proceeds, taken in connection with the accompanying drawings, in which:

Figure 1 is a side view of a table-type horizontal boring, drilling and milling machine having a column way construction incorporating the invention;

Fig. 2 is a right hand end view of this same machine;

Fig. 3 is a horizontal sectional view of the machine of Fig. 1 showing the column construction;

Fig. 4 is an enlarged fragmentary view of a section including the separable ways and the associated support and supporting surfaces of the headstock and column;

Fig. 5 is a modification of Fig. 4 showing a type of mounting pin arrangement for the ways; and Fig. 6 is another modification of Fig. 4 showing a type of mounting bolt arrangement for the ways when the key and keyway are reversed from the organization of Fig. 4.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the invention is to cover all modifications, alternative constructions and equivalents falling within the spirit and scope of the invention as expressed in the appended claims.

Referring to the drawings, one illustrative form of this invention is shown as incorporated in the table-type horizontal boring, drilling and milling machine of Fig. 1. This machine has a main frame or bed 10 which is horizontal and is suitably anchored to the floor. The bed is provided along its upper side edges with suitable longitudinal guides or ways 11 upon which a saddle (not shown) is adapted to travel along the length of the horizontal bed, this saddle being provided with a work table mounted for movement transversely of the bed.

Rigidly mounted on one end of the bed at one side of its center axis is an upstanding column 13, suitably a generally hollow casting of cast iron, preferably internally ribbed for greater strength. The general shape of the column is suitably conventional in design, the column having side walls transverse to the horizontal bed and having a front face 14 facing the center horizontal axis of the bed. The intermediate portion of the front face 14 (Fig. 5) is desirably concave, partly for the purpose of providing adequate clearance for the headstock assembly to be described, leaving two spaced way bearing column posts or standards 15, 16.

Spaced detachable ways 17, 18 are secured to the sides of the column standards, offering guide surfaces on which a machine tool headstock 19 is slidable vertically. This headstock incorporates a rotatable horizontal tool spindle 20, the design of the headstock being suitably conventional so far as the purposes of the present invention are concerned. As shown in Fig. 1, the horizontal spindle carries a milling cutter 21 as illustrative of the use of the machine and to aid in illustrating the nature of the load requirements of the way assembly.

The headstock 19 may be further briefly described with respect to its actuation and engagement with the column ways to illustrate the nature of the requirements of the column and way construction.

Thus the headstock has a casing 22 formed in the rear, that is, at the side facing the column, with parallel spaced channels 23, 24 affording bearing surfaces engaging the front surfaces and outer side surfaces of the ways 17, 18 on the machine column 13. Removably secured to the rear of the casing 22 at each outer side and overlapping the rear surfaces of the corresponding ways on the column are fixed outer gib plates 25, 26 and tapered gibs 27, 28. Tapered gibs 29, 30 are also adjustably secured within the headstock casing to slidably engage the transverse outer surface of the right hand way and a portion of the transverse inner surface presented by the left hand way respectively of the column assembly.

In order to clamp the headstock in any position of adjustment on the column two horizontally aligned clamps 31, 32 are mounted on the headstock for engagement with the machine column 13. As shown in Figs. 3 and 4, the column posts or beams 15, 16 are each provided with an undercut shoulder 33, 34 on their inwardly facing sides. These clamps are mounted respectively on two vertical rotatable spindles 35, 36 and a pair of horizontally aligned bearing lugs 37, 38 extending rearwardly from the headstock casing 19. The outer ends of the clamps overlie the inwardly flanged edges 33, 34 of the column posts while the inner ends of the clamps extend toward each other to substantially a medial plane. To hold the headstock 19 in a given vertical position on the face of the machine column, the inner ends of the clamping levers are urged away from the headstock by an adjusting lever 39, the upper end of which has side flanges 40, 41 underlying the clamping levers. The adjusting lever is effective to force the outer ends of the clamping levers into engagement with the undercut surface of the left and right column posts or standards thus clamping the headstock against the column. The vertical lever itself may be fulcrumed on the rear surface of the headstock and it will be appreciated that the lever ratios both of the horizontal clamping levers and the vertical adjusting or actuating lever may be selected to multiply the actuating force on the clamping arrangement to assure positive clamping of the headstock in place.

The headstock is reciprocable on the machine column by means of a vertical power feed suitably taking the form of a nut (Fig. 1) rigidly mounted in the lower wall of the casing of the headstock and a vertical feed screw 46 in threaded engagement with the nut and extending through the casing of the headstock to the top of the column where it is rotatably anchored. The lower end of the screw is adapted for connection to a suitable power drive.

The horizontal spindle 20, of the headstock, likewise is powered both for rotation and axial feed. A spindle drive shaft 47 which extends to the base of the column and the upper end of which is splined and extends to an anchor 48 at the top of the column is suitable for this purpose.

While the construction of the spindle and spindle drive is not of particular concern here, it will be apparent that not only is the head stock assembly necessarily massive and heavy, but also that the reaction forces at the cutting surfaces of the tool are transmitted through the headstock to the ways upon which it is mounted.

The direction and magnitude of the reaction forces developed during machining operations with this machine tool depend largely upon the type of operation. As illustrative, the principal forces developed in boring and drilling are the result of end thrust on the headstock spindle 20, shown as the arrow $T_1$ in Figs. 1, 3 and 4. Milling operations on the other hand, as shown by the arrow $T_2$ in Figs. 3 and 4, result in relatively large thrust forces transverse to the headstock spindle, for in this operation normally the work table is reciprocated beneath the milling cutter, the cut being taken as the work table moves from the back towards the front of the machine as viewed in Fig. 1.

The major forces developed, therefore, are across the front face of the column, and from the back of the column towards the front face tending to drive the headstock off the column, and these reaction forces must be transmitted from the headstock spindle, to the headstock casing, the ways, and taken up by the column posts or standards.

Referring now to the column 13 itself, as shown in Fig. 4, the column is fashioned on its front face 14 with two integral upright posts or standards 15, 16. These standards have a front reference surface, the front surfaces of the two standards being aligned, and inwardly facing surfaces which are cut away to provide clamping flanges 31, 32. The ways, 17, 18, however, are not supported on the front surfaces of the column standards but instead laterally of each standard, that is, on the sides of the standards, so as to provide a front surface adjacent to and spaced from the front of the column. As particularly shown in this Figure 4, the outwardly facing side or way bearing surface of each column standard is machined to form a rectangular keyway 50, 51, the standards being sufficiently massive so that a relatively wide keyway can be incorporated without weakening the column structures or without impairing the rigidity of the column standards.

The ways 17, 18 themselves are of substantially rectangular cross section and each is intended to be supported by means of a mounting assembly on the outwardly facing side surface of the respective column standard, the ways extending for the effective working height of the column. In the illustrative form of the invention depicted the way members 17, 18 are made of flame hardened cast iron which is machined and accurately ground to the finished dimensions. In the embodiment illustrated in Fig. 4 the cross section is rectangular with the axial width of the way, that is, the front and rear lateral dimensions, being substantially less than the depth of the way or the transverse dimension. Along the transverse side surface of each of the ways where it abuts the column standard, for mounting purposes, an integral rectangular key 52, 53 is fashioned for insertion in the column keyways 50, 51. The key itself has a height less than the depth of the keyway providing clearance in the bottom of the keyway, since the bearing surfaces relied upon for transmitting the forces resulting from end thrust ($T_1$) on the headstock spindle, to the columns, are substantial flat surfaces of the rectangular way laterally of the key and abutting the outer side way supporting surfaces of the column posts or standards. The key is sized for a fit in the keyway which will enable assembly.

As may be noted, the material in the face of the rectangular ways abutting the column posts and on the side of the key immediately adjacent their inner corner section is cut to a slightly greater depth to prevent corner binding. The external corner of the outer face of the column standard and the keyway wall is also chamfered to further assure large area positive seating of the abutting portions of the rectangular way and the column standard.

While the ways 17, 18 are attached to the sides of the column standards 15, 16 instead of to their front faces or surfaces, inwardly facing load bearing way surfaces are still obtained by the construction and arrangement illustrated where a portion of each way projects forwardly of the column front surfaces. As shown in Fig. 4 where the transverse or depth dimension of the rectangular way is substantially larger than the width or axial dimension, a portion of the way along the long dimension extends beyond the front face of the column standards, thus placing the locating key approximately midway of the outer side of the column standards.

In the form of the invention depicted in Fig. 4, in order to attach the ways 17, 18 to the column posts or standards 15, 16, a plurality of vertically spaced bolts 55, 56 are employed (for convenience only one of the vertically spaced bolts is shown). The inner surface of each column standard opposite the keyways is bored, 57, 58, and counterbored, 57', 58', to receive the bolts and bolt heads. The ways 17, 18 have aligned bores, extending through the key portion and into the body of the way and threaded, so that when the bolts are fastened in place the ways are firmly held against vertical displacement as well as against movement away from the column standards. It should be noted that the bolts themselves do not carry a major load. For the most part, the bolts carry only the weight of the ways, preventing them from slipping downwardly, and while even this load could be easily removed by pads or shims between the column base and the lower ends of the removable ways, for convenience when installing the ways such support means are not ordinarily employed. The heads of the bolts while recessed are readily accessible and do not call for disassembling of the machine in order that they may be removed. Likewise access is also assured without resort to defacing any bearing surface of the ways by drilling a hole through the way to accommodate the mounting screw.

A particularly advantageous relationship of the bearing surfaces of the ways is afforded by reason of their installation laterally of the column standards. For machine tool operations such as milling when conventionally the work table is reciprocated transversely of the headstock spindle and the cut taken on the forward pass, the thrust $T_2$ developed results in the greatest load being applied against the rear surfaces 60, 61 of the ways 17, 18. With the present arrangement the bearing area presented by these surfaces is proportionally larger, for the full relatively wide surface is made available for distribution of the reaction forces from the spindle without interruption of securing bolts, keyways or the like. The front surfaces 62, 63 of the ways, while in conventional operation ordinarily not subjected to major stresses, will support loads of the same magnitude as the rear surfaces of the ways.

The forces of greatest magnitude are generally developed while milling as described hereinbefore. By introducing relatively wide bearing surfaces presented by rear faces 60, 61 of the ways for receiving these major forces, unit load on the bearing areas is reduced with a corresponding reduction in wear. Additionally, these major forces are transferred to the column by substantial flat bearing surfaces, in the present instance the abutting surfaces of the keyways in the column standards and the keys on the ways and not the mounting bolts. In this arrangement these bolts generally serve only indirectly in transmitting load to the column standards.

The bearing areas presented by the outer transverse surfaces 64, 65 of the ways are subject to the direct thrust forces ($T_1$) developed in boring, drilling or reaming. Moreover, as mentioned hereinbefore, these forces are transmitted in large part directly to the left hand column standard 15 through the left hand way 17. While the transverse dimension of the outwardly facing sides of the ways is shown as larger than the width or axial dimension of the ways, the load applied to this outer surface in conventional machining operations is generally less than the load applied to the rear surface of the ways. Hence the distinction drawn between the rear surface of the way as presenting a major load bearing surface and upon which a proportionally greater amount of wear is likely to be experienced.

Another form of mounting arrangement for attachable ways constructed in accordance with this invention is shown in Fig. 5, where a column structure generally similar to that described in connection with Fig. 4 is disclosed, but in which mounting pins 70, 71 are employed in place of mounting bolts for fastening the ways 17, 18 on the column posts or standards 15, 16. Here, as in the case of Fig. 4, the substantially rectangular separate ways are fashioned with an integral key 52, 53 inserted within keyways 50, 51, machined in the vertical outwardly facing sides of the column standards. With this construction these pins 70, 71 are driven into closely fitting aligned bores extending at right angles to the front face of the column standard through the keyway and the column metal on both sides of it. Since the pin bore as shown is blind, it is preferable that the pins themselves be hollow and for this purpose are made of steel cylinders machined and ground to their finished dimension. The hollow pin permits the entry of hydraulic fluid to the end of the bore for forcing the pin out when the way is to be removed.

Utilizing pins extending through the sides of the key on the way instead of extending from the top surface of the key does not affect the manner of distribution or transmission of the forces to which the ways are subjected. This way structure transmits the major stresses, as for example developed in milling, through the substantial flat bearing areas contiguous to the keyways and keys. As in the form of the invention described previously and illustrated in Fig. 4, the mounting pins 70, 71 primarily restrain against endwise movement of the ways 17, 18, the pins shown in this case again being readily accessible for removing the ways without calling for defacing the ways or dis-assembling the column.

A further illustrative mounting arrangement for the ways 17, 18 on a machine column 13 is depicted in Fig. 6. As in the previous forms of the invention like reference numerals are used to designate like parts of the machine tool construction. Here, the general organization of the column 13, parallel spaced column standards 15, 16, and substantially rectangular separable ways 17, 18, is similar to that hereinbefore described and shown, but the mounting for the ways differs. In place of having a key provided as an integral portion with the separate way, and a keyway machined in the column standards, the arrangement is reversed. Accordingly, the ways 17, 18 are each machined on the surfaces contiguous with the machine standards 15, 16, with keyways 80, 81 in which keys 82, 83 integral with the column standards are inserted. Furthermore, a plurality of vertically spaced and axially directed mounting bolts 84, 85 are employed for securing the ways on the column standards. These bolts are threaded into aligned bores 86, 87 drilled in the ways and standards, and counterbored 88, 89 (to accommodate the bolt heads) for enabling access to the bolts from the outwardly facing sides 64, 65 of the ways. Although with this arrangement the smooth bearing surface presented by the outwardly facing sides of the ways is interrupted by the spaced counterbored openings, the width of the surface is so very substantial that the loss of bearing area represented by the counterbored openings does not result in materially increased wear on the remaining area. In the present instance, it may be desirable to insert a cap over the bolt heads as shown in Fig. 6.

I claim as my invention:

1. A machine tool having a vertical column presenting spaced vertical standards having aligned front faces and parallel outer surfaces extending substantially at right angles to the front faces of the standards, a headstock carried for vertical movement on said standards with the spindle extending across the front of the column, a pair of substantially rectangular cross section ways keyed on the sides of said column standards on the said outer surfaces thereof and means defining cooperating keys and keyways in the abutting surfaces of said ways and column standards, each of said ways presenting a major rear load bearing surface substantially parallel with the aligned front faces of the standards, a transverse outer load bearing surface, and a front surface adjacent to and spaced from the front of the column; said headstock including bearing surfaces slidable on the surfaces presented by said ways; forces developed in machining operations with the headstock spindle and applied transversely of the spindle to said rear load bearing surfaces being transmitted to the column standards through the keys and cooperating keyways, and forces developed in machining operations and applied axially of the spindle to said outer load bearing surfaces being transmitted directly to the column standards through the outer surfaces on which the ways are supported.

2. A machine tool having a vertical column presenting a pair of spaced vertical standards having aligned front faces and transverse, outer side way support surfaces, a pair of ways keyed on the outer sides of the column standards, each of said ways having an inner way surface abutting the outer side way support surface of the respective column standard, keys fastened on the inner surface of said ways, and keyways on the abutting column standard surfaces for receiving said keys, each of said ways presenting: a major outer rear load bearing surface substantially parallel with the aligned front faces of the standards, and a transverse outer load bearing surface, for a headstock slidable vertically on said ways, said headstock having a spindle extending across the front faces of the standards; forces developed in machining operations with said headstock spindle and applied axially thereof to said outer load bearing surfaces being transmitted directly to the column standards through the outer surfaces on which the ways are supported, and forces developed in machining operations with said headstock spindle and applied transversely thereof to said major rear load bearing surfaces being transmitted to the column standards through the key and keyway surfaces.

3. In a machine tool having an upright frame and a pair of standards for slidably supporting a headstock, each of said standards having a vertical front face and a transverse, outer side way support surface, an attachable way keyed on the outer side of one of said column standards, and a key and a keyway on the abutting surfaces of said one standard and the way, said way presenting: an outer major rear load bearing surface substantially parallel with the vertical front face of the standard, and a transverse outer load bearing surface, for mounting the headstock on said standards; forces developed in machining operations with said headstock and applied transversely of the standards to said major rear load bearing surface being transmitted to said one standard through the key, and forces developed in machining operations with the headstock and applied across the face of the standards to said outer load bearing surface being transmitted directly to said one standard through the outer side surface on which the way is supported.

4. A machine tool having a vertical column presenting spaced, vertical standards having alined front faces and transverse outer side way support surfaces, a pair of substantially rectangular cross section ways mounted on the outer sides of the column standards presenting rear and front way surfaces of substantially equal size, each of said ways having an inner way surface abutting the outer side way support surface of the respective column standard, means defining a vertical keyway in the inner way surface of each of said ways, and means carried by said standards defining an outwardly directed key receivable in said keyway, said rear way surface of each of said ways presenting a major outer rear load-bearing surface substantially parallel with the alined front faces of the standards, each of said ways also presenting a transverse outer load-bearing surface; and a machine tool component slidable vertically on said ways having bearing surfaces engageable with the way surfaces presented by said ways; forces developed in machining operations with said component and applied transversely of the alined front faces of said standards to said major rear load bearing surfaces being transmitted to the column standards through the keys and keyways, forces developed in machining operations with said component and applied across the alined front faces of the standards to said outer load-bearing surfaces being transmitted directly to the column standards through the outer surfaces on which the ways are supported.

5. A machine tool having a vertical column presenting a pair of spaced vertical standards having aligned front faces and transverse, outer side way support surfaces, an attachable way carried on the outer side of each of the column standards, each of said ways having an inner surface abutting the outer side way support surface of the respective column standard, and means for rigidly fastening said ways to said column standards including keys mounted on the inner surface of said ways, keyways for receiving said keys formed on the abutting outer side way support surface, and pins extending from the front faces of both of said columns rearwardly through said keys of said ways, each of said ways presenting: a major outer rear load bearing surface substantially parallel with the aligned front faces of the standards, and a transverse outer load bearing surface for a headstock slidable vertically on said way; forces developed in machining operations with said headstock and applied across the faces of said standards being transmitted directly to the column standards through the outer surfaces on which the ways are supported, and forces developed in machining operations with said headstock and applied transversely of the faces of said standards to said major rear load bearing surfaces being transmitted to the column standards through the key and keyway surfaces.

References Cited in the file of this patent

UNITED STATES PATENTS

| | | |
|---|---|---|
| 1,951,514 | Lovely | Mar. 20, 1934 |
| 2,374,919 | Bruseth | May 1, 1945 |
| 2,630,353 | Rutz | Mar. 3, 1953 |
| 2,672,675 | Cross | Mar. 23, 1954 |
| 2,743,967 | Lappe | May 1, 1956 |